W. B. KERN.
Straw Cutter.
No. 30,067.                                  Patented Sept. 18, 1860.
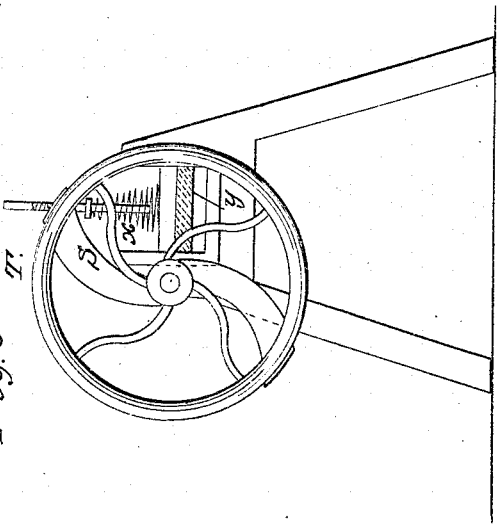
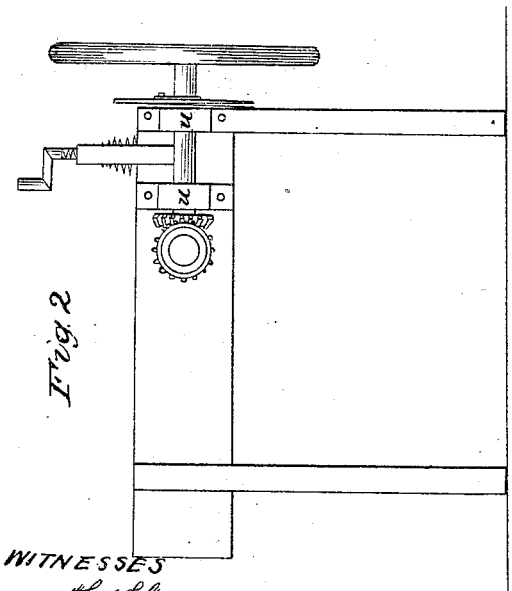
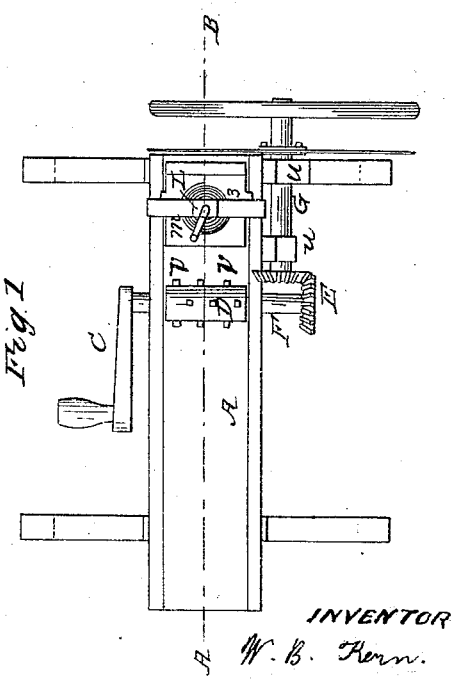
WITNESSES                                    INVENTOR

UNITED STATES PATENT OFFICE.

WILLIAM B. KERN, OF MIDDLEBOURNE, VIRGINIA.

STRAW-CUTTER.

Specification of Letters Patent No. 30,067, dated September 18, 1860.

*To all whom it may concern:*

Be it known that I, WILLIAM B. KERN, of Middlebourne, in the county of Tyler, in the State of Virginia, have invented a new, useful, and Improved Machine for Cutting Straw, Hay, and Fodder; and I do hereby declare that the following is a full, complete, and exact description of the same, reference being had to the annexed drawings, figures, and letters as part of this specification, Figure 1 being a horizontal section of the machine; Fig. 2 a side view; Fig. 3 a front view; Fig. 4 a vertical section through the line A, B.

The feed box A, Fig. 1, may be made in the usual manner and of the usual material used for straw, hay, and fodder cutters, of suitable dimensions and proportions. The feed shaft D, Fig. 1, (to which is attached the crank C,) passes through the box A, on either side of which bearings should be attached for the support of the shaft D. On the end of this shaft is attached a beveled spur wheel E, which drives the pinion of the same size F, which is attached to the revolving shaft G, Fig. 1. This shaft may be secured in its proper position by bearings $u\ u$ Fig. 2.

The cutting blade S and fly wheel T, Fig. 3, are secured on the shaft G, to which motion is given by turning the crank C.

The shaft D is made with teeth $v\ v$ placed on the part within the box A, of suitable number, length and distance apart to secure regularity in the feeding.

The straw, hay or fodder may be kept in its place by the pressure of the spiral spring $x$ on the block $y$, Fig. 4, placed and secured so as to move up or down within the box A by means of the guides fastened to the block $y$, which work in the grooves $z\ z$, Fig. 1.

The degree of pressure may be regulated by the screw L and frame M, Fig. 1.

What I claim as my invention and desire to secure by Letters Patent, is—

The arrangement of the pressure block $y$, spreading spiral spring $x$, screw L and frame M, combined with box A, feed shaft D, and cutting blades S as and for the purpose set forth.

W. B. KERN.

Witnesses:
 THOS. I. STEALY,
 W. I. BOREMAN.